Figure 1:
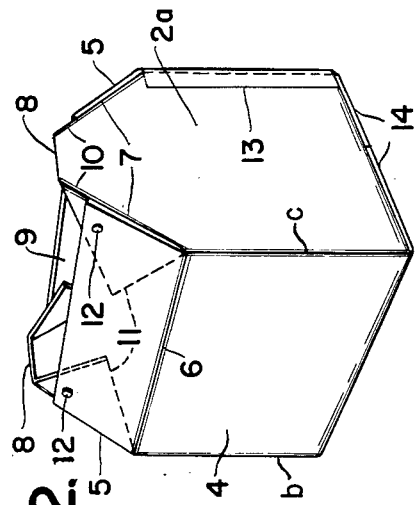

Jan. 9, 1962 W. J. CURN, JR 3,016,042
SMALL ANIMAL HOUSE
Filed Sept. 29, 1958

INVENTOR.
William J. Curn, Jr.
BY
his attorneys

United States Patent Office 3,016,042
Patented Jan. 9, 1962

3,016,042
SMALL ANIMAL HOUSE
William J. Curn, Jr., Box 307, Steubenville, Ohio
Filed Sept. 29, 1958, Ser. No. 764,100
2 Claims. (Cl. 119—19)

This invention relates to small animal houses and particularly to a small animal house of extremely low cost but of great utility when used indoors.

My small animal house is intended primarily for use by dogs so I shall describe my invention as embodied in a doghouse although it will be understood that the invention is also adaptable for housing other small animals. When my invention is embodied in a doghouse the doghouse will be of appropriate size for the dog to be housed, relatively large for relatively large dogs and relatively small for relatively small dogs.

My doghouse is intended for use indoors where it is not subjected directly to the elements, particularly rain, snow, sleet, sun and wind. My doghouse is ideally suited to be the dog's "home within the home" and may be placed in the basement, kitchen or any other room in the house where the dog sleeps. Since my doghouse is intended for indoor use it is desirable that while it should be large enough to adequately house the dog it should not take up unnecessary space inside the house. My doghouse will ordinarily be perhaps somewhat smaller in relation to the size of the dog to be housed than an outside doghouse would be.

To avoid giving the dog the feeling of being boxed in, especially since the house will in most cases be somewhat smaller in relation to the size of the dog to be housed than an outside doghouse would be, I like the doghouse open-topped. Not only is the provision of the open top designed to inhibit claustrophobia in the dog but it has the additional very important function of ventilating the doghouse to provide the dog with fresh air for breathing and to expel odor-laden air. Since the doghouse is intended for indoor use and is not subject to the direct action of the elements there is no need of complete overhead cover for the dog and by providing an opening in the top of the house I produce a chimney effect which induces a very moderate upward draft which ventilates the doghouse. I find that the opening in the top of the doghouse should be of less area than the body or lower portion of the doghouse. This contributes to effective ventilation while affording some overhead closure yet not boxing in the dog to such an extent that he will refuse to use the doghouse.

My small animal house comprises a front wall having an opening therethrough to admit a small animal, side and rear walls connected with the front wall to form a substantially peripherally closed enclosure and a top structure having an opening therethrough of less area than the substantially peripherally closed enclosure. The house may have a bottom although since it is intended for indoor use the bottom is optional and may be omitted.

The top structure preferably has portions cooperating with the substantially peripherally closed enclosure providing a top opening of less area than the substantially peripherally closed enclosure. At least some of the portions of the top structure may be inclined inwardly and upwardly from the substantially peripherally closed enclosure providing a top opening of less area than the substantially peripherally closed enclosure. The top opening is preferably generally centrally disposed and at an elevation above the top of the substantially peripherally closed enclosure. The top structure preferably comprises flaps connected with the substantially peripherally closed enclosure and providing a top opening of less area than the substantially peripherally closed enclosure. The flaps preferably have overlapping portions adapted to be fastened together to maintain the top structure substantially rigid.

In a preferred form my small animal house may comprise front and rear walls each having at least portions of its upper edge inclined downwardly and laterally from the central portion thereof, the front wall having an opening therethrough to admit a small animal, side walls cooperating with the front and rear walls to form a substantially peripherally closed enclosure and a top structure having portions cooperating with the substantially peripherally closed enclosure at least some of which are inclined inwardly and upwardly providing a top opening of less area than the substantially peripherally closed enclosure.

My small animal house may be foldable and made out of a single appropriately slit and creased blank of material comprising a front wall having an opening therethrough to admit a small animal, side and rear walls forming with the front wall when the house is set up a substantially peripherally closed enclosure and a top structure comprising flaps connected with the substantially peripherally closed enclosure and providing a top opening of less area than the substantially peripherally closed enclosure.

Other details, objects and advantages of the invention will become apparent as the following description of a present preferred embodiment thereof proceeds.

Figure 2:
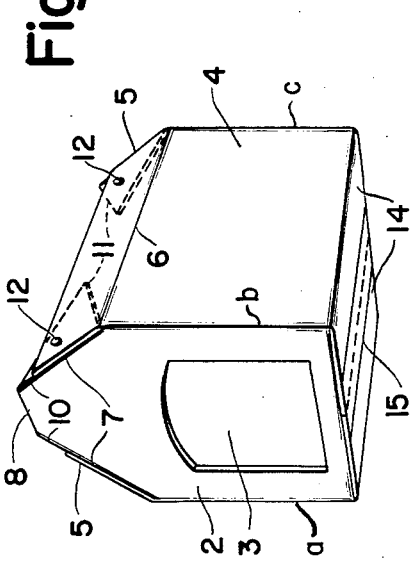
Figure 3:
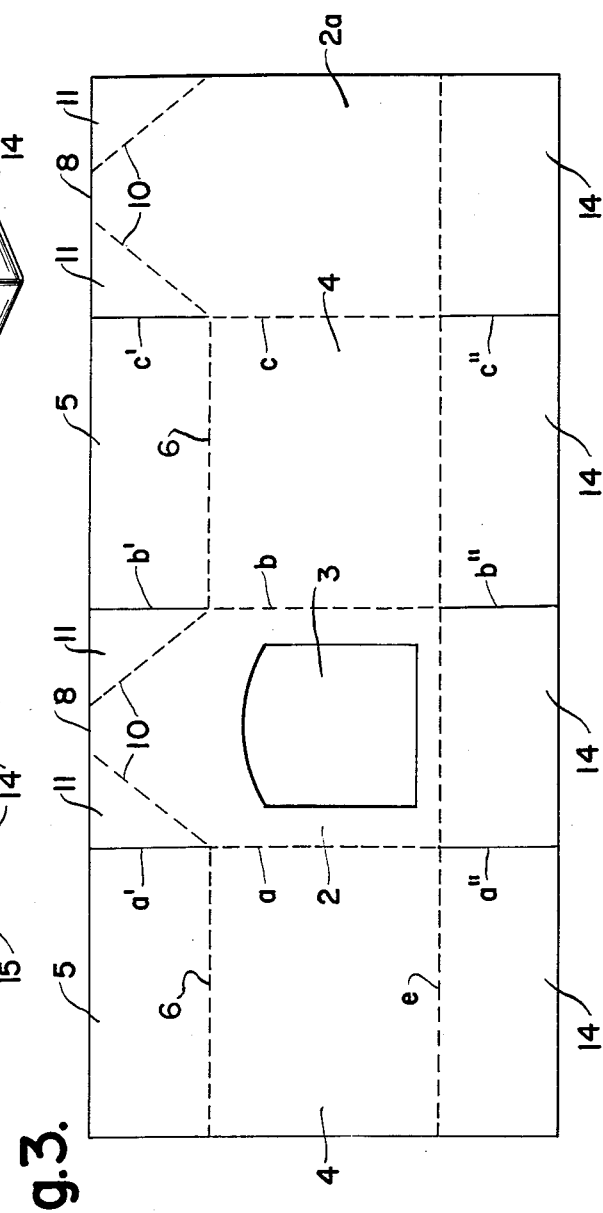

In the accompanying drawings I have shown a present preferred embodiment of the invention in which FIGURE 1 is a perspective view of a doghouse showing the bottom, front, one side and a portion of the top of the doghouse;

FIGURE 2 is a perspective view of the doghouse shown in FIGURE 1 showing the rear, the side opposite that shown in FIGURE 1 and a portion of the top of the doghouse; and FIGURE 3 is a plan view of a slit and creased blank of foldable material adapted for forming the doghouse.

The doghouse has a front wall 2 having an opening 3 therethrough to admit a dog, opposed side walls 4 and a rear wall 2a opposed to the front wall 2 and of the same shape but not containing an opening like the opening 3, although if desired such an opening may be provided in the rear wall. Flaps 5 are formed integrally with the side walls 4, being joined thereto by creases 6, the structure being identical at both sides of the doghouse. Each of the front and rear walls 2 and 2a has portions 7 of the upper edge thereof inclined downwardly and laterally from the central portion 8 thereof. Attached to the edges 7 and 8 by creases 10 coincident with those edges are triangular flaps 11 which when the doghouse is set up lie underneath and coplanar with the respective side flaps 5 and may be fastened thereto by any suitable fastening means such as prong fasteners, adhesive, etc. Prong fasteners 12 are shown in FIGURES 1 and 2. The top structure of the doghouse provides a top opening 9 which is centrally disposed and of less area than the body of the doghouse formed by the front, side and rear walls and which may be termed a substantially peripherally closed enclosure. When the house is set up the front, side and rear walls will be connected with one another at creases $a$, $b$ and $c$ which become the vertical corner edges at three corners of the body of the house and at the fourth corner the walls will be fastened to each other by any suitable fastening means, such, for example, as adhesive tape 13.

While as above mentioned the provision of a bottom for the doghouse is not essential a bottom may be provided by a flap or flaps connected by creased edges with the bottoms of the front, back and side walls or certain thereof. The bottom may be a single flap covering the whole area of the bottom of the doghouse connected with any of the generally vertical walls or it may be made up of two opposed flaps meeting or overlapping at the central portion of the floor of the doghouse, or four flaps may be provided which may overlap each other to form a double thickness floor. Four flaps 14 are shown in the drawings. The floor flap or flaps may be maintained in place with respect to the body of the doghouse or with respect to each other by any suitable fastening means, such, for example, as adhesive tape. FIGURE 1 shows adhesive tape 15.

The provision of the top opening 9 affords ventilation and also inhibits the dog having a feeling of being boxed in. A gentle upward draft is induced by the top opening 9 which affords just the right degree of ventilation.

FIGURE 3 shows a slit and creased blank of corrugated cardboard or other suitable material out of which the doghouse may be formed. The blank as shown is rectangular in shape. Three creases $a$, $b$ and $c$ are formed crosswise across the central portion of the blank and slits $a'$, $b'$ and $c'$ and $a''$, $b''$ and $c''$ are made through the edge portions of the blank in line with the creases $a$, $b$ and $c$ respectively as shown in FIGURE 3. The two creases 6 above mentioned, which are in spaced apart longitudinal alignment as shown in FIGURE 3, and a continuous crease $e$ are formed lengthwise of the blank, the crease $e$ extending completely from one end of the blank to the other. The diagonal creases 10 are formed as shown in FIGURE 3, three of such creases terminating at their lower ends in an end of one of the creases 6 and the fourth terminating at its lower end at an end of one of the creases 6 when the house is set up. In the drawings the creases are designated by dotted lines and the slits by solid lines.

Thus fourteen panels or flaps are provided for by the slits and creases in the blank, the front panel 2, the rear panel 2a, the two side panels 4, the two top flaps 5, the four bottom flaps 14 and the four triangular flaps 11. The front panel 2 which will be the front wall of the doghouse has in it the opening 3 to admit a dog or other animal of suitable size. The opening is shown as having a straight bottom and straight sides with a rounded top to facilitate movement of the animal therethrough. The side walls of the house are constituted by the panels 4 and the rear wall by the panel 2a. The free edges of the rear wall 2a and one of the side walls 4 are fastened together by adhesive tape 13 as above described. The flaps 14 form the floor of the house. When the house is set up they are bent so as to extend inwardly at right angles to the wall panels 2, 2a and 4 respectively. The floor panels overlap, forming substantially a double thickness floor. The edges of the floor panels may be fastened together by adhesive tape 15 or other suitable fastening means as above explained.

When the house is set up the flaps 11 are bent so that they lie flush against the under faces of the flaps 5, which assume inclined position, and they are fastened to those flaps by suitable fastening means as mentioned above such as the prong fasteners 12 shown in FIGURES 1 and 2.

The front and back of the doghouse are at the central portions thereof the full height of the panels 2 and 2a respectively, the height tapering down from the central portion 8 of the top of each to the upper edges of the side walls. The top opening is rectangular, of the full length of the doghouse and has a width only a fraction of the width of the doghouse so that its area is only a fraction of the area of the floor of the doghouse.

If a doghouse without a floor is desired the blank will be the same as that shown in FIGURE 3 but omitting entirely the four flaps 14.

While I have shown and described a present preferred embodiment of the invention it is to be distinctly understood that the invention is not limited thereto but may be otherwise variously embodied and practiced within the scope of the following claims.

I claim:

1. A foldable small animal house comprising a single initially flat blank of material comprising a front wall having an opening therethrough to admit a small animal, side and rear walls forming with the front wall when the house is set up a substantially peripherally closed enclosure and a top structure comprising flaps connected with the substantially peripherally closed enclosure and whose edges define portions of a top opening of less area than the substantially peripherally closed enclosure.

2. A small animal house comprising front and rear walls each having a substantially horizontal central upper edge portion and adjoining downwardly inclined upper edge portions at both extremities of said substantially horizontal central upper edge portion, the front wall having an opening therethrough to admit a small animal, side walls cooperating with the front and rear walls to form a substantially peripherally closed enclosure and a top structure having portions cooperating with the substantially peripherally closed enclosure at least some of which are inclined inwardly and upwardly and terminate at least substantially as low as said substantially horizontal upper edge portions providing a top opening having a horizontal dimension at least equal to the length of said substantially horizontal central upper edge portions.

References Cited in the file of this patent

UNITED STATES PATENTS

| | | |
|---|---|---|
| 946,706 | Richards | Jan. 18, 1910 |
| 1,682,594 | Benjamin | Aug. 28, 1928 |
| 1,808,829 | Barnes | June 9, 1931 |
| 1,950,104 | Ewers | Mar. 6, 1934 |
| 2,092,155 | Hackett | Sept. 7, 1937 |